(12) United States Patent
Perry

(10) Patent No.: US 8,961,753 B2
(45) Date of Patent: Feb. 24, 2015

(54) ELECTROLYTIC CELL ASSEMBLY

(75) Inventor: Loren R. Perry, Fountain Valley, CA (US)

(73) Assignee: Balboa Water Group, Inc., Tustin, CA (US)

( * ) Notice: Subject to any disclaimer, the term of this patent is extended or adjusted under 35 U.S.C. 154(b) by 2759 days.

(21) Appl. No.: 11/294,181

(22) Filed: Dec. 5, 2005

(65) Prior Publication Data

US 2007/0125642 A1    Jun. 7, 2007

(51) Int. Cl.
| | | |
|---|---|---|
| C25B 9/00 | (2006.01) | |
| C25B 9/06 | (2006.01) | |
| C02F 1/461 | (2006.01) | |
| C02F 1/467 | (2006.01) | |
| C02F 103/42 | (2006.01) | |

(52) U.S. Cl.
CPC ......... *C02F 1/4674* (2013.01); *C02F 2209/005* (2013.01); *C02F 2001/46152* (2013.01); *C02F 2201/4611* (2013.01); *C02F 2103/42* (2013.01); *C02F 2001/46138* (2013.01)
USPC ...................................... 204/278.5; 204/242

(58) Field of Classification Search
CPC .............. C25B 9/00; C25B 9/06; C02F 1/461

USPC ...................................... 204/278, 242, 278.5
See application file for complete search history.

(56) References Cited

U.S. PATENT DOCUMENTS

| | | | |
|---|---|---|---|
| 3,632,498 A | 1/1972 | Beer | |
| 3,711,385 A | 1/1973 | Beer | |
| 4,367,569 A * | 1/1983 | Harmon | 24/453 |
| 4,713,170 A * | 12/1987 | Saibic | 210/85 |
| 4,992,156 A | 2/1991 | Silveri | |
| 5,254,226 A | 10/1993 | Williams et al. | |
| 6,270,680 B1 * | 8/2001 | Silveri et al. | 210/746 |
| 6,372,372 B1 * | 4/2002 | D'Aleo et al. | 429/434 |
| 6,802,956 B2 * | 10/2004 | Orlebeke | 205/701 |

OTHER PUBLICATIONS

Balboa Direct, Users Guide & Installation Instructions for Economatic Models: ESC 16, 24, 36, 48, pp. 1-22, www.balboadirect.com, date unknown.

* cited by examiner

*Primary Examiner* — Zulmariam Mendez
(74) *Attorney, Agent, or Firm* — Larry K. Roberts

(57) ABSTRACT

An electrolytic cell assembly for connection to a liquid flow line includes an electrode set, a cell housing supporting the electrode set, a cell retainer attached to the flow line and in fluid communication with the flow line, and a connection for detachably connecting the housing to the cell retainer in an operating position.

8 Claims, 7 Drawing Sheets

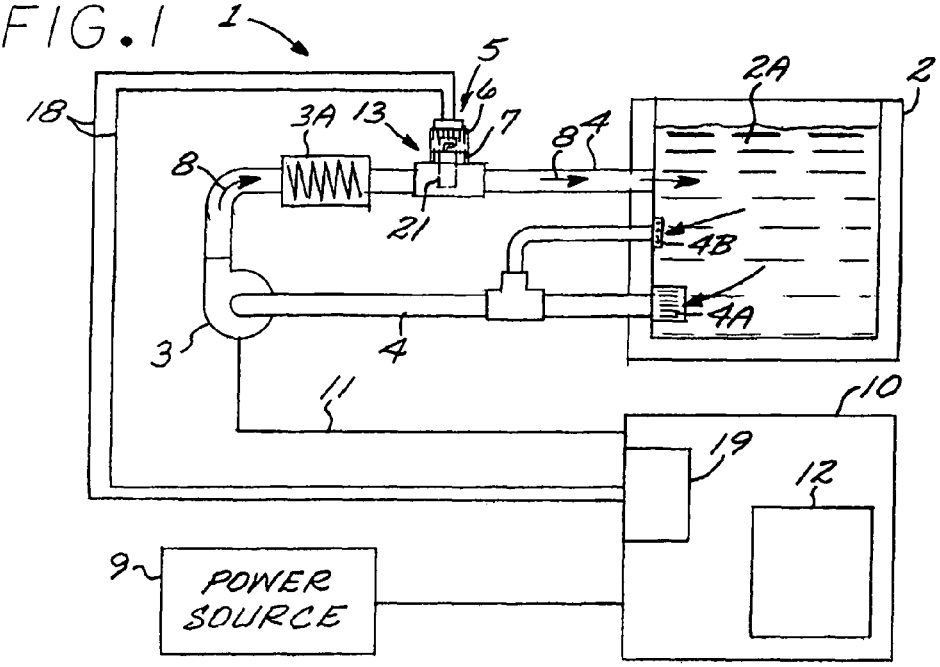
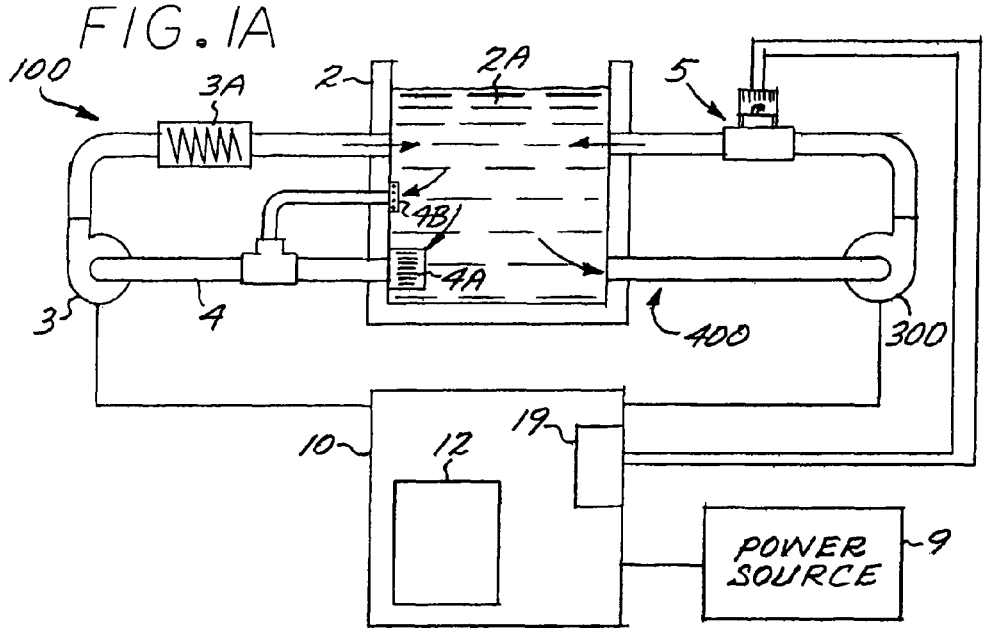

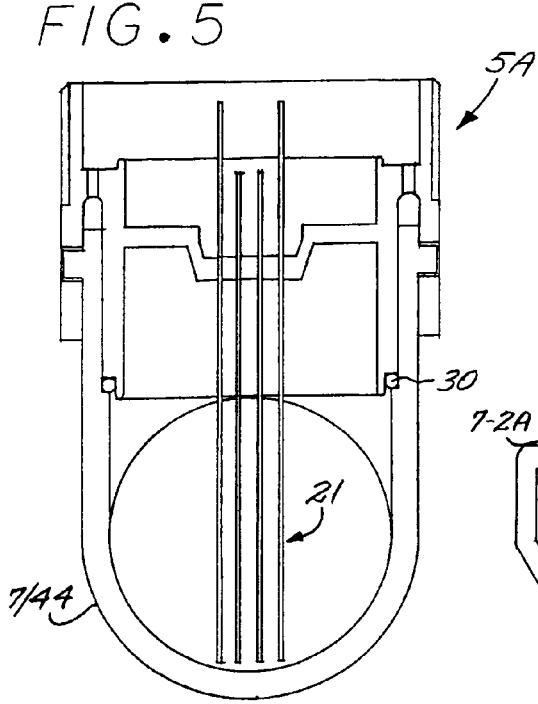
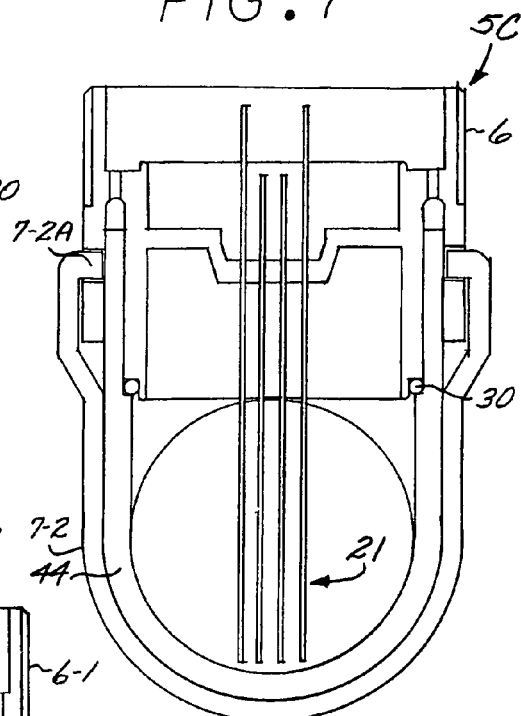
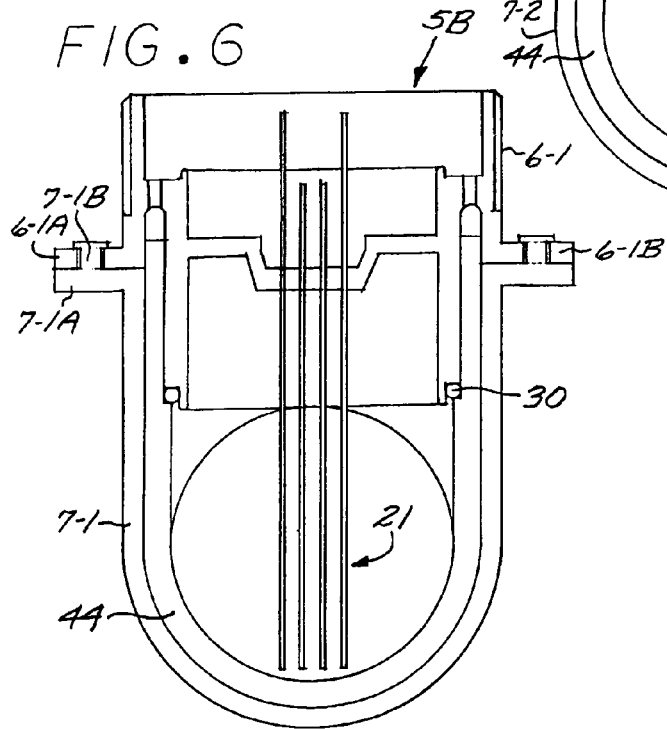

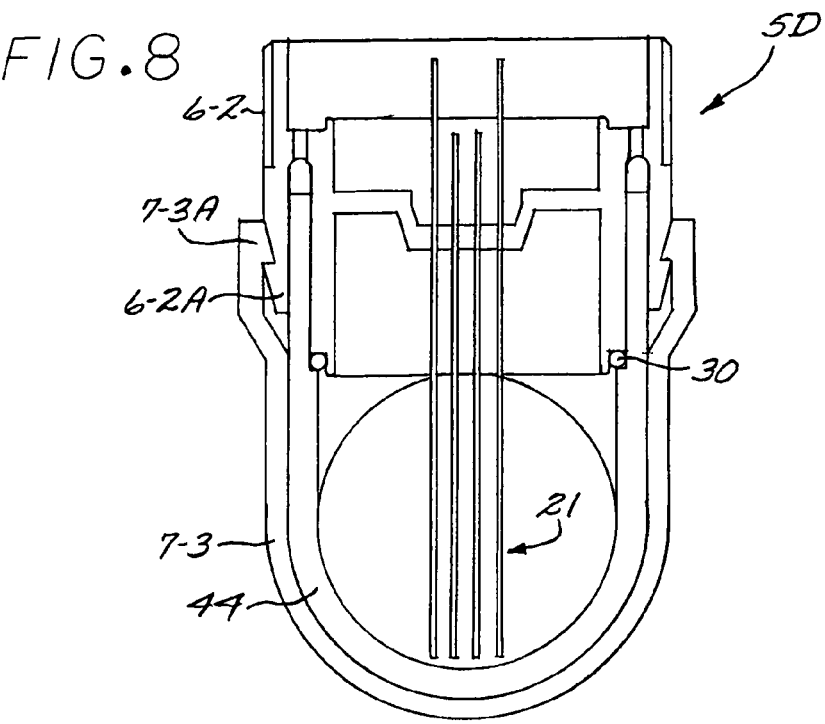
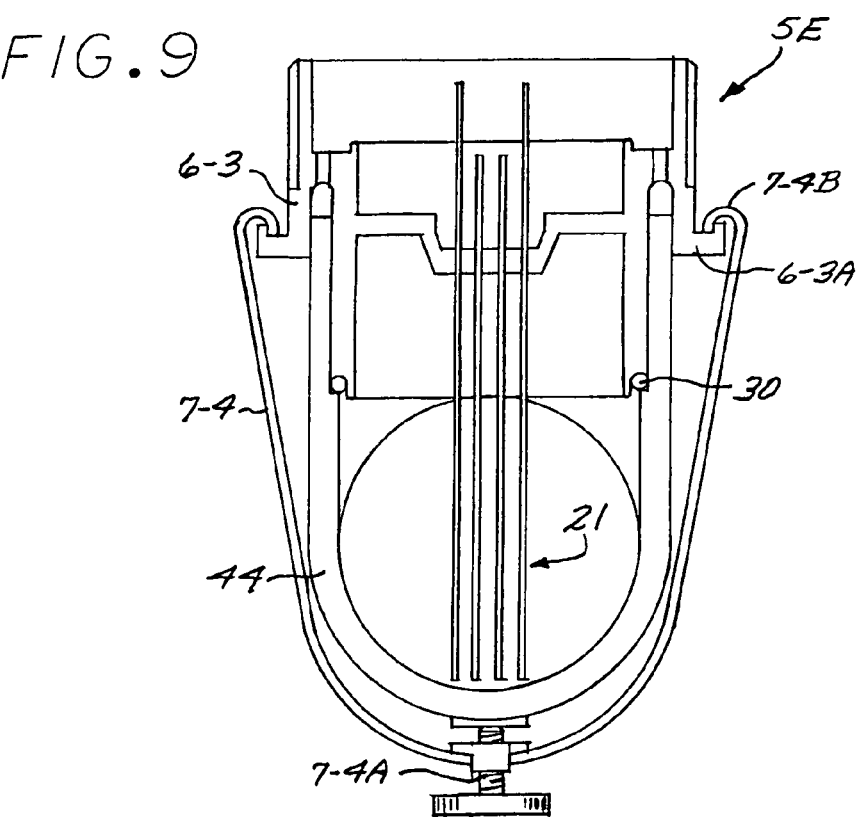

ELECTROLYTIC CELL ASSEMBLY

BACKGROUND OF THE DISCLOSURE

Electrolytic cells can be used to generate a halogen, such as bromine or chlorine, for providing sanitizing water treatment in a body of water. For example, electrolytic cells may be used to sanitize swimming pools, spas, or hot tubs. The electrolytic cell may include plates mounted in a recirculating flow path for the body of water. It may be desirable to periodically remove the cell for inspection, cleaning, repair or replacement.

BRIEF DESCRIPTION OF THE DRAWINGS

Features and advantages of the disclosure will be readily appreciated by persons skilled in the art from the following detailed description of exemplary embodiments thereof, as illustrated in the accompanying drawings, in which:

FIG. 1 illustrates an exemplary embodiment of a bathing installation such as a spa or pool system.

FIG. 1A illustrates an alternate exemplary embodiment of a bathing installation such as a spa or pool system.

FIGS. 5-13 are respective schematic depictions of alternate embodiments of an electrolytic cell assembly.

DETAILED DESCRIPTION OF THE DISCLOSURE

Figure 2:
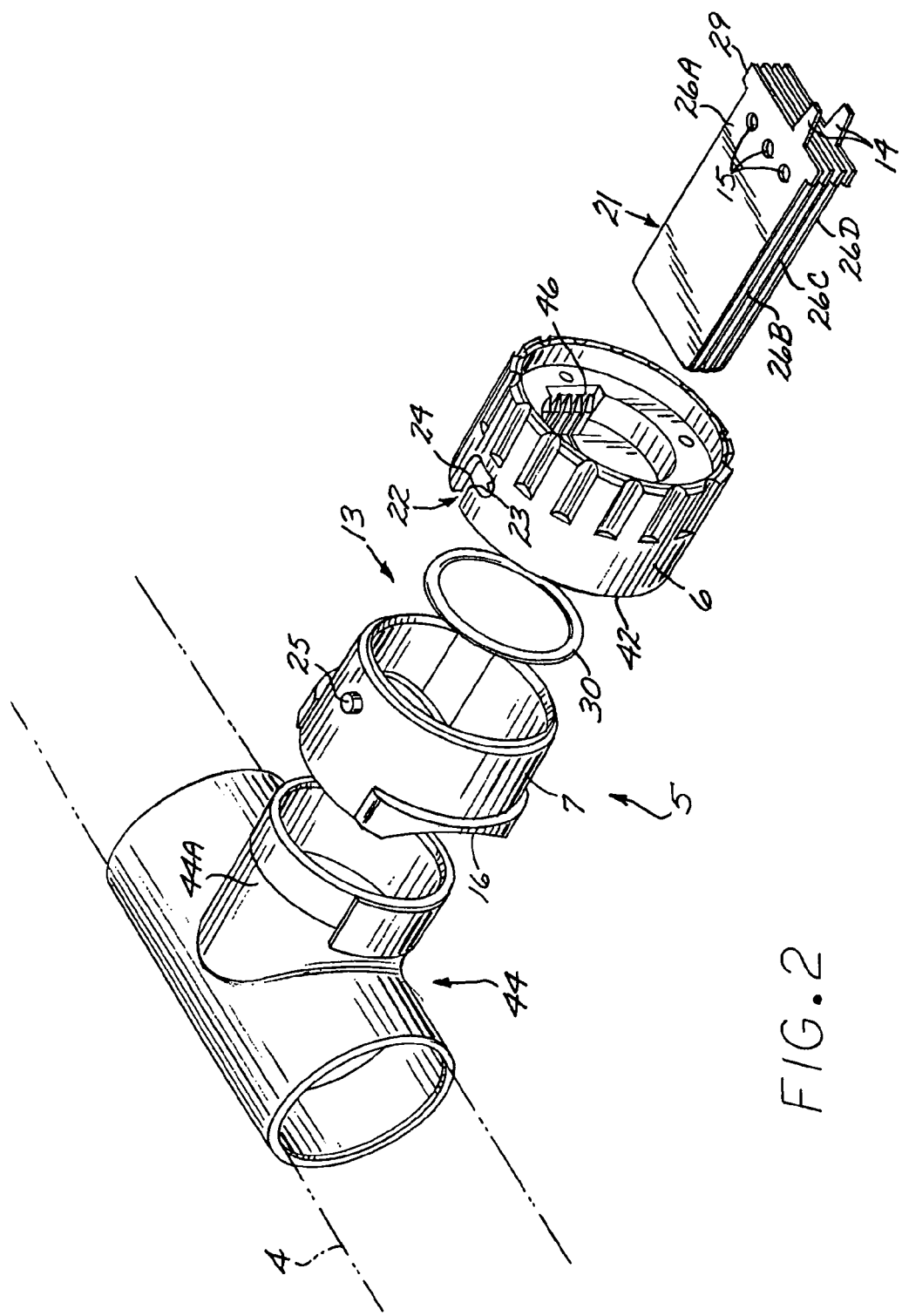
FIG. 2 illustrates an exploded view of an exemplary embodiment of an electrolytic cell assembly.

In the following detailed description and in the several figures of the drawing, like elements are identified with like reference numerals.

FIG. 1 illustrates an exemplary embodiment of a spa or pool system 1. In an exemplary embodiment, a spa or pool system 1 may include a vessel 2 holding a body of water 2A such as, for example, a pool, spa or hot tub. The spa or pool system 1 may also include a pump 3 for recirculating the water. In an exemplary embodiment, the pump 3 may draw water from the body of water 2A through a filter 4A and a secondary suction port 4B into a recirculating water flow line 4, and pump the water back into the body of water 2A through a discharge side of the recirculating water flow line 4. The filter may be located at various locations in the vessel 2, and is diagrammatically shown in FIG. 1. In an exemplary embodiment, the recirculating water flow line may be piping, for example PVC piping. A heat exchanger or heater 3A may be in the water flow line 4.

In an exemplary embodiment, the spa system 1 may include an electrolytic cell assembly 5. The electrolytic cell assembly 5 may include an electrolytic cell housing or electrode plate support 6 supporting electrode plate set 21, and a connection port or cell retainer 7 for detachably connecting the housing 6 to an opening in the flow line 4. The cell retainer 7 may include an opening fluidically connected to the flow path 8 through the flow line 4. In an exemplary embodiment, the cell retainer 7 may be attached to a tee 44 which is connected in the flow line 4. The electrode plate set 21 may extend through the cell retainer 7 and into the flow path 8 within the flow line 4. Operation of the electrolytic cell assembly 5, in an appropriate aqueous solution, may cause the generation of halogens, for example chlorine or bromine, thereby provide sanitizing water treatment for water moving along the flow path 8 through the flow line 4. In an exemplary embodiment, the electrolytic cell assembly may be located on the flow line 4 on the discharge side of the pump 3. In another embodiment, the electrolytic cell assembly may be located on the flow line 4 on the intake side of the pump.

In an exemplary embodiment, the housing 6 holds the electrode plate set 21 in a fixed, desired orientation with respect to the flow path 8 in an operating position. In an exemplary embodiment, the electrode plate set 21 may be arranged in parallel planes which may be parallel with the direction of the flow path 8 to mitigate resistance to water flow through the electrolytic cell assembly 5.

In an exemplary embodiment, the housing 6 and electrode plate set 21 may be detachably connected to the cell retainer 7 by an indexed connection 13 arranged to hold the housing 6 and electrode plate set 21 in place in the operating position, with the housing 6 in a desired, fixed orientation to hold the electrode plate set 21 parallel to the flow path and at a desired fixed insertion distance within the flow line 4. The indexed connection 13 may include latching pin entrance slot 22, latching pin landing 23 and latching pin 25 (FIGS. 2 and 3) arranged on one or the other of the cell retainer 7 and/or the housing 6. In an exemplary embodiment, the entrance slot 22, landing slot 23 and latching pin 25 (FIGS. 2 and 3) operate together to hold the housing 6 in place on the cell retainer 7 with the electrode plate set 21 in the desired, fixed orientation with respect to the flow path 8.

In an exemplary embodiment, detachably connecting an electrolytic cell housing 6 on a cell retainer 7 may provide for convenient maintenance and/or replacement of the electrolytic cell by avoiding the necessity of removing an entire segment of flow line 4. In an exemplary embodiment, using an indexed connection 13 may provide a convenient method of fixing the electrode plate set 21 in an operating position with a desired orientation in the flow path 8.

Referring again to FIG. 1, in an exemplary embodiment, the spa or pool system 1 includes a control system 10, which receives electrical power from an external voltage source 9, typically a line voltage at 120 VAC or 240 VAC. The control system 10 provides auxiliary power lines 11 to supply power at the appropriate voltage and current levels to operate and control various components of the spa or pool system 1, including for example the pump 3. Other typical components may include a water heater 3A and a light system. In an exemplary embodiment, the control system 10 includes an electrolytic cell drive circuit 19 which provides electrical power to drive the electrolytic cell 5 through lines 18. The control system 10 may include a microprocessor-based controller 12 which provides control signals and power to the electrolytic cell drive circuit 19. Alternatively, the drive circuit 19 may be a stand alone circuit which may interact with control system 10.

FIG. 1A illustrates an alternate exemplary embodiment of a spa or pool system 100. In an exemplary embodiment, the electrolytic cell assembly 5 is connected in a separate recirculating water path or circuit 400. A pump 300 may be controlled by the control system 10 to recirculate water through the water path 400 and the cell 5 to provide a desired halogen content in the spa or pool. This permits independent control over a function provided by the cell 5, e.g. a sanitizing function, without requiring the heating and/or water recirculation functions provided by pump 3 be activated. The control system 10 may include a microprocessor-based controller 12 which provides control signals and power to the electrolytic cell drive circuit 19. Alternatively, the drive circuit may be a stand alone circuit which may interact with control system 10.

FIG. 2 illustrates an exploded view of an exemplary embodiment of an electrolytic cell assembly 5. In an exemplary embodiment, an electrolytic cell assembly 5 may include a cell housing 6, electrode plate set 21 and a cell retainer 7 connected to the recirculating water flow line 4 by attachment to a tee 44 connected in the flow line 4. In an exemplary embodiment, the housing 6 may be detachably connectable to the cell retainer 7 by an indexed connection 13.

In an exemplary embodiment, the cell retainer 7 may be formed as a separate unit such as a collar or fitting to be attached to tee 44. The tee 44 receives the cell retainer 7, which may be an adapter unit having an inner diameter sized to be received over the transverse portion 44A of the tee 44 in a close-fit sliding relationship. For example, the tee 44 may be fabricated of PVC, ABS, plastic, a high temperature plastic, or other suitable material. In an exemplary embodiment, the tee 44 may be a standard 2" schedule 40 PVC tee. In an exemplary embodiment, the cell retainer 7 may be fabricated of PVC, ABS, plastic, a high temperature plastic, or other suitable material. In an exemplary embodiment, the cell retainer 7 is attached to the tee 44 by an adhesive or solvent which acts to weld adjacent surfaces together. Such adhesives are known in the art to connect elements of PVC piping systems. In the exemplary embodiment of FIG. 2, the cell retainer adaptor unit 7 has a contour-shaped shoulder 16 formed to meet the outside of the tee 44. In this embodiment, the shoulder 16 is curved to fit against the curved outer periphery of the tee 44, so that the rotational position of the cell retainer 7 is fixed in relation to the line 4 and tee 44.

Figure 3:
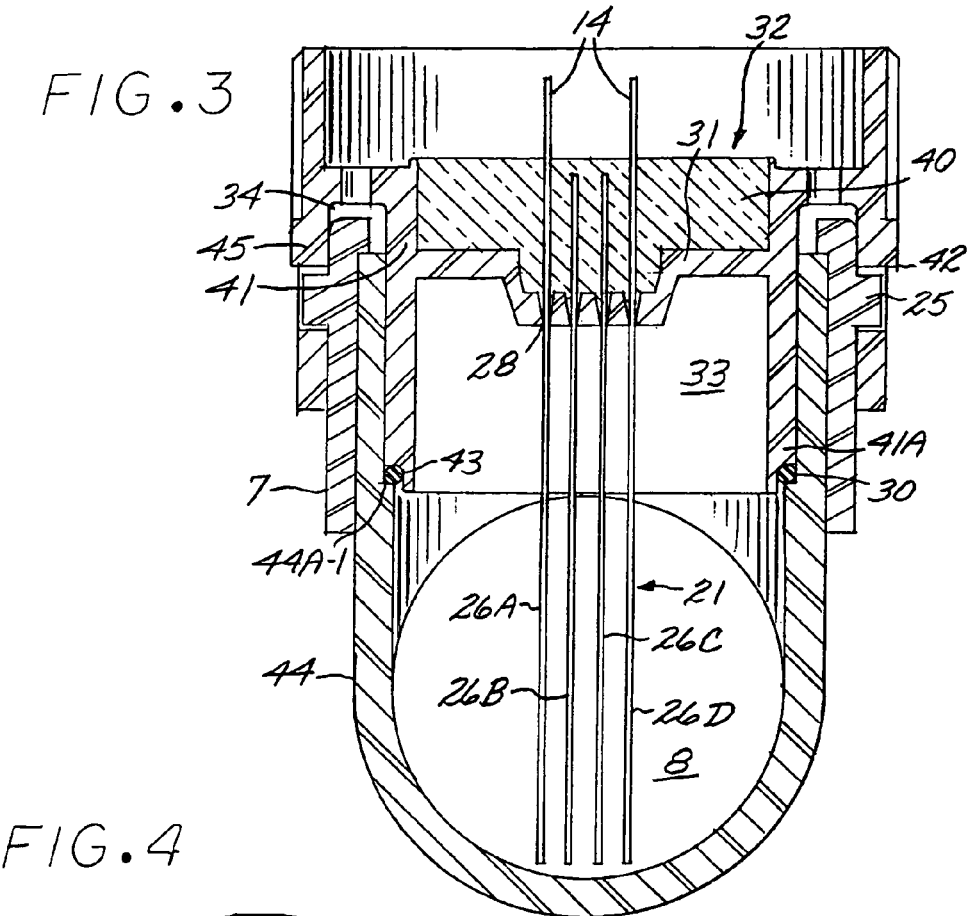
FIG. 3 illustrates a cross-sectional view of an electrolytic cell assembly.

In an exemplary embodiment, the housing 6 may comprise of PVC, ABS, plastic, for example a high temperature plastic, or other suitable material. In an exemplary embodiment, the housing 6 may include a longitudinally-extending latching pin entrance slot 22 and an indexed laterally-extending latching pin landing slot 23 (FIG. 2). A latching pin retaining lip 24 may be formed in housing 6 at the inner corner between the latching pin entrance slot 22 and the latching pin landing slot 23. In an exemplary embodiment, there may be two entrance slot/landing slot structures located on radially opposite sides of the housing and cell retainers as shown in FIG. 3, for example. In exemplary embodiment, the entrance slots 22, landing slots 23 and latching pin retaining lips 24 may interact with a latching pin 25 on the cell retainer 7 to form an indexed connection 13. In an exemplary embodiment, the latching pin entrance slot 22 has a longitudinal length and width that is suitable to allow the latching pin to enter. The latching pin landing slot likewise has a suitable lateral length and width to allow the latching pin to enter. In an exemplary embodiment, for a pin 25 diameter of 0.315 inch, the latching pin entrance slot 22 has a longitudinal length of 0.870 inch, and a width of 0.320 inch, and the latching pin landing slot 23 has a lateral length of 0.630 inch and a width of 0.375 inch.

In an exemplary embodiment, the entrance slot 22, landing slot 23 and latching pin retaining lip 24 may be arranged to mate with the raised latching pin 25 on the cell retainer 7. In an exemplary embodiment, the housing may be slid along its longitudinal axis onto the cell retainer 7 with the slot 22 aligned with the latching pin 25, which guides the housing into the desired position. The housing 6 may slide over the cell retainer 7 until the latching pin 25 stops further travel at the end of the slot 22. The housing 6 may then be rotated, less than 360 degrees in an exemplary embodiment, providing relative motion between the latching pin 25 and the latching pin retaining lip 24 until the housing 6 and cell retainer 7 are fully engaged with the latching pin 25 in the landing slot 23 In an exemplary embodiment, the housing 6 may be rotated an angular distance of about 10 degrees relative to the cell retainer 7 to move the latching pin retaining lip 24 over the pin 25 to position the pin in the landing slot 23. In an exemplary embodiment, the landing slot 23 and latching pin retaining lip 24 may tend to hold the latching pin 25 in place when installed. The housing 6 is removable by pressing and rotating the housing 6 to move the latching pin retaining lip over the pin 25 to align the pin with the slot 22 and then pulling the housing 6 back from the cell retainer 7.

In an exemplary embodiment, the latching pins 25 and latching pin landings 23 are indexed with the desired orientation of the plates of the electrolytic cell such that the plane of the plate set 21 of the electrolytic cell 5 may be in a desired orientation with respect to a fluid flow path 8 when the housing 6 is attached to the cell retainer 7 and the latching pins 25 are fully engaged within the landing slots 23.

FIG. 3 illustrates a cross-sectional view of an exemplary embodiment of an electrolytic cell assembly 5 including an electrolytic cell housing 6, electrode plates 21, cell retainer 7 and flow line tee 44. The housing 6 is positioned in the attached, operational position relative to the cell retainer 7 and tee 44. When attached, the electrode plate set 21 extends through the transverse portion 44A of the tee 44 and into the flow path 8. In an exemplary embodiment, the plates 26A-26D may extend about 3.23 inches beyond the support structure 31 into the tee 44. In an exemplary embodiment, the ends of the plates 26A-26D may extend to about 0.023 inches or about 0.026 inches from the inside wall of the distal end of the tee 44 installed in the flow line 4.

In an exemplary embodiment, the latching pin entrance slots 22 in the housing 6 may be aligned to fit over the latching pins 25 on the cell retainer 7. In an exemplary embodiment, the latching pins 25 are arranged on the cell retainer 7 at positions aligned perpendicular to a flow path 8 (FIGS. 1 and 2) through the flow line 4. The electrode plates 26 will be rotated at an angle slightly away from being parallel with the flow path when being inserted over the cell retainer 7 while the latching pins are in the slots 22. When the housing 6 is fully engaged with the cell retainer 7, the housing 6 may be rotated so that the latching pins 25 fit within latching pin landings 23. In an exemplary embodiment, the relative orientation of the plates, the latching pins and the latching pin landing slot are arranged so that the plates are parallel with the flow path when installed to reduce or mitigate flow restriction through the flow line.

In an exemplary embodiment, a mass of sealant 40, which may be a dielectric potting material, covers the ends of the plates 26A-26D on the dry side 32 of the housing 6. In an exemplary embodiment, the sealant 40 fixes the plates 26A-26D in their desired position and seals the plate slots 28 against leakage. Terminals 14 for plates 26A and 26D may extend above a surface of the sealant 40 for connecting to a drive circuit.

The electrolytic cell assembly may include a seal 30, for example a rubber or synthetic elastomer O-ring, for sealing the housing 6 when in the installed position. Thus, in an exemplary embodiment, an O-ring 30 is installed at the end 41A of an inner portion 41 of the mating end 42 of the housing 6. In an exemplary embodiment, the inner portion 41 has a notch 43 around its circumference in which the O-ring 30 may be placed. In an exemplary embodiment, the external radius of the inner portion 41 fits snuggly with the internal radius of the transverse tube extension 44A of the tee 44. The O-ring and the snug fit of the inner portion 41 of the mating portion 42 of the housing 6 provide a seal against water leakage between the flow line 4 and the housing 6. The inner surface of the transverse portion 44A of the tee 44 has a slight taper, ending at a shoulder 44A-1, which is standard on schedule 40

PVC tee fittings. The O-ring acts in compression with the tapered inside wall of the portion 44A, the shoulder 44A-1 and the groove 43 to provide a radial seal.

In an exemplary embodiment, the entrance slot 22, landing slot 23 and latching pin retaining lip 24 may be in a radially outer portion of the mating end 42 of the housing 6. The mating end of the cell retainer 7 and the transverse tube portion 44A of the tee 44 of the flow line 4 may fit in a recess 34 between an outer portion 45 of the mating end 42 of the housing 6 and an inner portion 41 of the mating end 42 of the housing 6 (FIG. 3).

Figure 4:
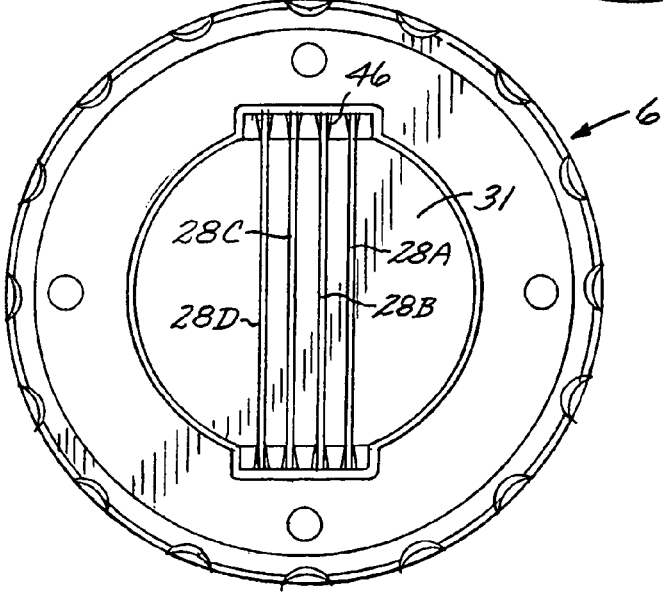
FIG. 4 illustrates a top view of an exemplary embodiment of an electrolytic cell housing.

FIG. 4 illustrates a top view of an exemplary embodiment of the housing 6, which may include a plurality of plate slots 28 corresponding to plates of an electrolytic cell to be housed in the housing. In an exemplary embodiment, guide notches 46 in the housing correspond to the stops or extensions 29 (FIG. 2) on the dry-side ends of the electrolytic plates to be installed. In an exemplary embodiment, the notches 46 may provide a guide for installing and arranging the plates in the proper aspect and orientation. In an exemplary embodiment, the notches 46 are on an inner wall recessed within the housing. In an exemplary embodiment, the recess may be filled with a sealant 40 (FIG. 3) to secure the plates in their desired position and seal against water leakage.

In an exemplary embodiment, the electrode plate set 21 may include a plurality of plates, for example four plates 26A-26D, which are supported in the housing 6 in slots 28 (FIGS. 3-4) formed in the housing. In an exemplary embodiment, the plates may comprise titanium plates. In an exemplary embodiment, the plates may be coated with an anodically active material. Exemplary anodically active materials are discussed in U.S. Pat. Nos. 3,632,498 and 3,711,385, the entire contents of which are incorporated herein by this reference. By way of example, one material suitable for the coating is ruthenium.

In an exemplary embodiment, the electrode plate set 21 produces a halogen, for example bromine or chlorine, when the plate set 21 is in an appropriate aqueous solution and operatively connected to an electrical drive circuit, e.g. circuit 19. In an exemplary embodiment, at least two of the plates have electrical connection portions or terminals 14 (FIGS. 2-3) for connecting the electrolytic cell to wiring 18 connected to the drive circuit. In an exemplary embodiment, the outer plates or primary plates 26A and 26D are connected to opposite polarities of an operating voltage waveform.

The housing 6 and cell retainer 7 may each be injection molded of a molded material, e.g. a plastic material.

In an exemplary embodiment, the electrical connection portions or terminals 14 may extend above an encapsulant sealant 40 (FIG. 3) covering the ends of the plates 26A-26D in the housing 6 on the dry side 32 of the housing 6. In an exemplary embodiment, the encapsulant sealant 40 may comprise a chemically resistant material, for example an epoxy. The plates 26A-26D may have holes 15 (FIG. 2) through the plates which will be above the plate slots 28, on the dry side 32 (FIG. 3) of the housing 6 when the plates are installed. In an exemplary embodiment, the holes 15 may allow liquid sealant to be dispensed from a single point and allow the sealant to flow between the plates evenly, and may fill with sealant 40 (FIG. 3) which may help hold the plates in place when installed. The plates each have end side tabs 29 (FIG. 2) which fit into guide notches 46 (FIGS. 2 and 4) in the housing 6 adjacent the slots 28, and which serve to register the position of the plates along the longitudinal extent of the housing 6.

In an exemplary embodiment, the plates 26A-26D are electrically isolated from each other. The two inner plates or secondary plates 26B-26C are not connected to the drive circuit 19 in an exemplary embodiment.

In an exemplary embodiment, the plates 26A-26D of the cell assembly 5 are held in place by the web portion or plate support structure 31 (FIGS. 3-4) within the housing 6. In an exemplary embodiment, the cell support structure 31 may be a solid barrier between a dry side 32 and a wet side 33 of the housing. In an exemplary embodiment, the support structure 31 may include plate support slots 28 through the support structure 31. The "wet side" refers to the side of the support structure which may be exposed to water when the housing is installed in a spa or pool system and the "dry side" refers to the non-wet side of the support structure.

In an exemplary embodiment, the plate support structure 31 may have a number of slots 28 equal to the number of plates 21, each one for holding one of the plates 26A-26D in place within the housing 6 and at a desired orientation such that the plates 26A-26D may be substantially parallel with the flow path 8 when the housing is installed. In an exemplary embodiment, the slots are arranged to hold the plates in planes substantially parallel with each other. In an exemplary embodiment, the plates 26A-26D may have end side tabs 29 (FIG. 2) which enter guide notches 46 on the dry side of the support structure 31 when the plates 26A-26D are installed into the slots 28. In an exemplary embodiment, the housing 6 is a unitary structure fabricated by an injection molding process.

In an exemplary embodiment, the plates may be about 1.85 inches wide and 4.13 exclusive of the terminals. In an exemplary embodiment, the terminals on plates 26A and 26D may extend about 0.58 inches above the end of the plate. In an exemplary embodiment, the plates may be about 0.035 inches thick after plating and may be spaced about 0.24 inches apart from one another.

FIGS. 5-13 diagrammatically depict alternate embodiments of an electrolytic cell assembly. FIG. 5 depicts an assembly 5A which employs a one-piece cell retainer structure 7/44 which performs the functions of the cell retainer 7 and the tee 44 of the assembly depicted in FIGS. 1-4. The structure 7/44 may be a unitary structure fabricated by injection molding. In other respects, the assembly 5A is similar to assembly 5.

FIG. 6 illustrates a cell assembly embodiment in which the cell retainer is fitted about the body of the tee 44, from its underside and extending upwardly to present a shoulder 7-1A with pins 7-1B. The housing structure 6-1 is a modified version of the housing 6 of FIGS. 1-4, with a corresponding shoulder 6-1A and pin slots 6-1B. The indexed connection in this embodiment is achieved by inserting the electrode set into the tee opening to the depth illustrated, positioning the shoulders 7-1A and 6-1A in contact with each other, and rotating the housing 6-1 to seat the pins 7-1B against the distal ends of the slots 6-1B. The depth of the slots is selected so that the electrodes will be parallel to the flow path within the tee 44. The retainer 7-1 may be fabricated of a metal or a plastic such as PVC, and secured to the tee 44, e.g. by an adhesive or other attachment technique.

FIG. 7 illustrates an electrolytic cell assembly 5C which is analogous to cell assembly 5B of FIG. 6, except that the cell retainer 7-2 positions inwardly facing pins 7-2A to engage the slots of the housing 6. The housing 6 is identical to that depicted in FIGS. 1-4. An indexed connection of the housing 6 and electrode set 21 is provided by the pins 7-2A and the slots 22 and 23 (FIG. 2) of the housing 6. The retainer 7-2 may be fabricated of a metal or a plastic such as PVC, and secured to the tee 44, e.g. by an adhesive or other attachment technique.

FIG. 8 shows an electrolytic cell assembly 5D with a cell retainer 7-3 which may be assembled to a tee 44 in the same manner as retainer 7-1 or 7-2. The cell retainer 7-3 is formed with barbed fingers 7-3A, which capture corresponding barb features 6-2A of the housing 6-2. An indexed connection of the housing 6-2 and cell retainer 7-3 is provided in this example by features of the fingers 7-3A and/or features 6-2A. To connect the housing 6-2 in the operating position illustrated in FIG. 8, the housing 6-2 and electrode set 21 may be inserted into the tee, until the features 6-2A ride under the barb fingers 7-3A and seat into recesses under the barb fingers. Alternatively, the connection may be made by inserting the housing 6-2 and electrode set 21 into the tee in a position rotated to avoid contact with the fingers 7-3A, and then rotate the housing 6-2 to slide the barb features 6-2A into contacting position with the barb fingers 7-3A.

FIG. 9 illustrates an alternate embodiment of an electrolytic cell assembly 5E which employs a clamp retainer structure as a cell retainer 7-4. In this embodiment, the housing structure 6-3 is similar to that of housing structure 6 of FIGS. 1-4, but includes a set of protruding ear features 6-3A on opposed sides of the housing, at locations which will index the position of the housing to the tee 44. The retainer 7-4 is a clamp retainer structure, comprising a band portion which terminates at each end in hooks 7-4B. A clamp 7-4A is attached to the band portion, and includes a thumbscrew which may be turned to bear against the bottom of the tee, thereby exerting a force on the hooks 7-4B. With the hooks engaging the ear features, the force is exerted on the housing structure to hold it in the operating position shown in FIG. 9. To remove the housing 6-3, e.g. for cleaning, the thumbscrew may be loosened, allowing the hooks to be disengaged from the ear features.

Figure 10:
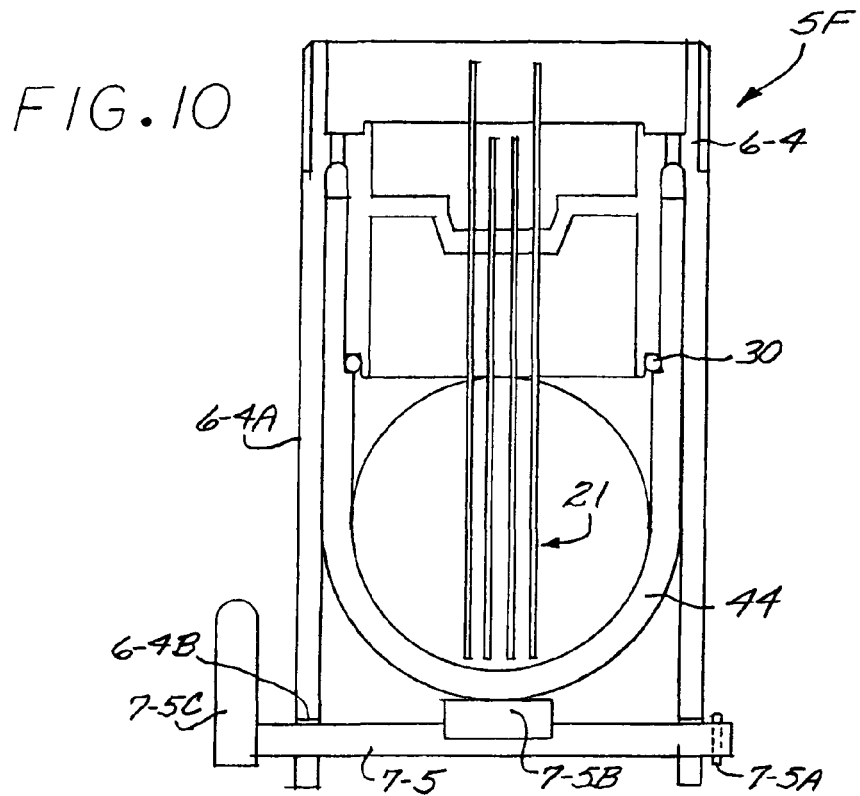

FIG. 10 depicts an embodiment of electrolytic cell assembly 5F, which employs as a cell retainer 7-5 a cam lock retainer structure. In this embodiment, the housing structure 6-4 is similar to housing 6 of FIGS. 1-4, except that the structure includes a pair of leg portions 6-4A which extend on opposite sides of the housing structure to a length sufficient to extend past the bottom of the tee 44 with the housing and electrode plate set 21 positioned in the operating position. Slots 6-4B are formed in the distal ends of the leg position to receive a cam lock pin 7-5. The pin includes a cam surface 7-5B and a transverse lock element 7-5A at an end distal from a handle 7-5C. The housing 64 and electrode set 21 may be positioned in the tee 44 in the operating position depicted in FIG. 10, and the retainer 7-5 inserted through the slots in the leg portions, and turned so that the cam surface bears against the bottom of the tee to lock the housing in position. The rotational position of the housing is indexed by the leg portions 6-4A.

Figure 11:
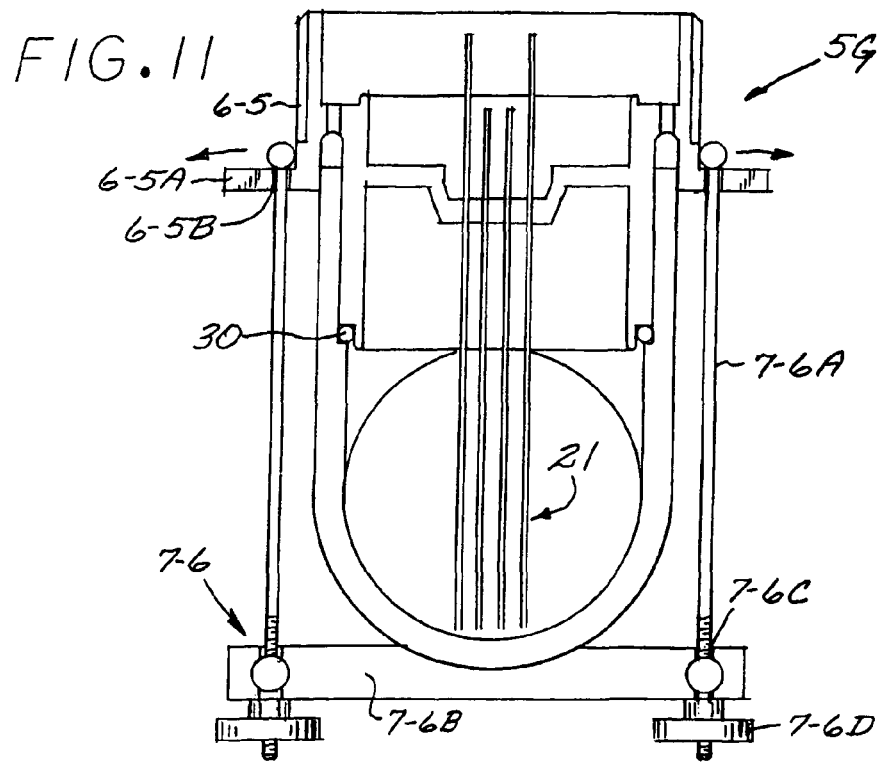

FIG. 11 depicts an embodiment of an electrolytic cell assembly 5G, which employs as a cell retainer 7-6 a clamp retainer structure. In this embodiment, the housing structure 6-5 is similar to housing 6 of FIGS. 1-4, except that the structure includes a pair of tab features 6-5A protruding from the housing at opposite sides thereof, each with a slot opening 6-5B formed therein. The cell retainer 7-6 in this embodiment includes a pair of retainer bolts 7-6A, a saddle member 7-6B and threaded fasteners 7-6D which thread onto a threaded end of the bolts. The distal end of the bolts have knobs formed therein which are larger than the size of slots 6-5B. The saddle fits against the underside of the tee 44. By tightening the fasteners 7-6D, force is applied on the bolts 7-6A, which is transferred to the housing 6-5 by action of the knob ends on the tab features. The bolts and saddle together with the tab feature location tends to register or index the rotational position of the housing relative to the tee, so that the plate set 21 is aligned with the flow through the tee. To remove the housing and electrode plate set from the tee, the fasteners may be loosened and the bolts slid out of the slots 6-5B.

Figure 12:
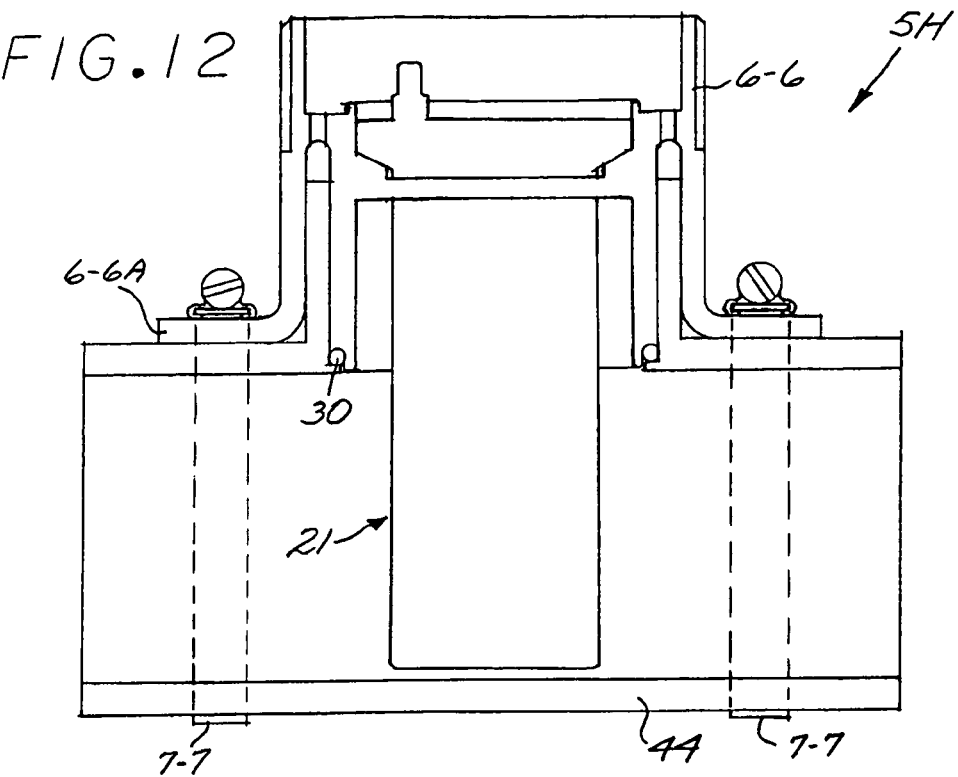
Figure 13:
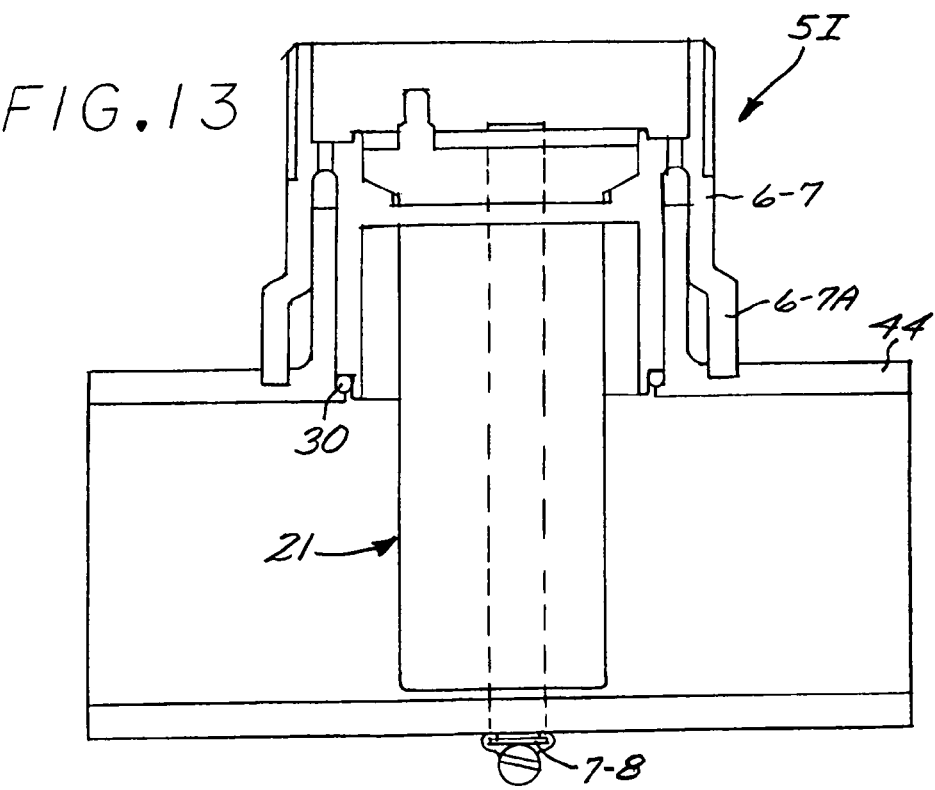

FIGS. 12 and 13 depict embodiments of an electrolytic cell assembly which employ as a cell retainer respective hose clamp retainer structures. The assembly 5H of FIG. 12 employs a housing structure 6-6 which is similar to housing 6 of FIGS. 1-4, except that the structure includes a pair of flanges 6-6A which are used to fasten the housing 6-6 and electrode plate set 21 in the operating position relative to the tee 44 by hose clamps 7-7. FIG. 13 depicts a cell assembly 5I in which the housing structure 6-7 is similar to housing 6 of FIGS. 1-4, except that legs 6-7A are sized to abut the top surface of the tee 44 when in the installed position. The legs have a contour surface which matches contours of the tee 44, and registers the radial position of the housing and electrode set 21. A single hose clamp 7-8 is passed around the tee 44 and through the dry portion of the housing to secure the housing 6-7 in the operating position. The housing can be removed for servicing by loosening the hose clamp.

It is understood that the above-described embodiments are merely illustrative of the possible specific embodiments which may represent principles of the present invention. Other arrangements may readily be devised in accordance with these principles by those skilled in the art without departing from the scope and spirit of the claimed subject matter.

What is claimed is:

1. An electrolytic cell assembly for connection to a liquid flow line, comprising:
   an electrode set;
   a housing supporting the electrode set;
   a cell retainer attached to the flow line and in fluid communication with the flow line; and
   an indexed connection for detachably connecting the housing to the cell retainer in an operating position, wherein the indexed connection is arranged so that the electrode set extends into a flow path in the liquid flow line and has a predetermined fixed and parallel orientation with respect to the flow path in the operating position, said indexed connection permitting ready removal and replacement of the housing and electrode set from the cell retainer;
   wherein the indexed connection includes a tee fitting connected in the liquid flow line and including a transverse portion; and
   wherein the cell retainer includes an adaptor structure integrally formed as a one-piece structure with the tee fitting.

2. The assembly of claim 1, wherein the indexed connection permits rotation of the housing on the cell retainer through a limited range of motion which is less than 360 degrees, between an insert position and the operating position.

3. An electrolytic cell assembly for connection to a liquid flow line, comprising:
   an electrode set;
   a housing supporting the electrode set;
   a cell retainer attached to the flow line and in fluid communication with the flow line; and
   an indexed connection for detachably connecting the housing to the cell retainer in an operating position, wherein the indexed connection is arranged so that the electrode set extends into a flow path in the liquid flow line and has a predetermined fixed and parallel orientation with respect to the flow path in the operating position, said indexed connection permitting ready removal and replacement of the housing and electrode set from the cell retainer;

wherein the indexed connection includes a tee fitting connected in the liquid flow line and including a transverse portion; and wherein the cell retainer includes a clamp for removably securing the housing to the tee fitting.

4. The assembly of claim 3, wherein the housing includes a set of protruding ear features disposed on opposed sides of the housing at locations to index the position of the housing to the tee fitting, and the clamp includes a clamp retainer structure, comprising a band portion which terminates at distal ends in hooks to engage the ear portions.

5. The assembly of claim 3, wherein the clamp includes a hose clamp for securing a flange of the housing to the tee fitting.

6. The assembly of claim 3, wherein the clamp includes a band passed about the tee fitting and the housing in a clamped position.

7. An electrolytic cell assembly for connection to a liquid flow line, comprising:
   an electrode set;
   a housing supporting the electrode set;
   a cell retainer attached to the flow line and in fluid communication with the flow line; and
   an indexed connection for detachably connecting the housing to the cell retainer in an operating position, wherein the indexed connection is arranged so that the electrode set extends into a flow path in the liquid flow line and has a predetermined fixed and parallel orientation with respect to the flow path in the operating position, said indexed connection permitting ready removal and replacement of the housing and electrode set from the cell retainer;

wherein the indexed connection includes a tee fitting connected in the liquid flow line and including a transverse portion; and wherein the cell retainer includes a cam lock pin structure for engaging a pair of legs extending from the housing on opposite sides of the tee fitting.

8. The assembly of claim 1, wherein the electrode set comprises a plurality of plates arranged in substantially parallel planes, wherein the plates are arranged in a substantially parallel arrangement with the flow path when the housing is in the operating position.

* * * * *